United States Patent [19]

Damerau

[11] 4,396,506
[45] * Aug. 2, 1983

[54] LIQUID CLARIFIER AND METHOD

[75] Inventor: Herbert R. Damerau, Farmington Hills, Mich.

[73] Assignee: Pecor Corporation, Taylor, Mich.

[*] Notice: The portion of the term of this patent subsequent to Jul. 19, 2000, has been disclaimed.

[21] Appl. No.: 297,060

[22] Filed: Aug. 27, 1981

[51] Int. Cl.³ ............................................. B01D 25/38
[52] U.S. Cl. .................................... 210/107; 210/108; 210/298; 210/408
[58] Field of Search ........ 210/779, 791, 804, 106–108, 210/262, 298, 408, 411, 413, 526

[56] References Cited

U.S. PATENT DOCUMENTS

| | | | |
|---|---|---|---|
| 2,865,509 | 12/1958 | Harlan | 210/526 X |
| 2,877,901 | 3/1959 | Maus | 210/298 X |
| 2,887,228 | 5/1959 | Harlan et al. | 210/298 X |
| 2,999,597 | 9/1961 | Harms | 210/526 X |
| 3,194,399 | 7/1965 | Harms | 210/413 X |
| 3,334,749 | 8/1967 | Ladd | 210/298 X |

Primary Examiner—Thomas G. Wyse
Attorney, Agent, or Firm—Burton, Parker & Schramm

[57] ABSTRACT

A clarifier allowing increased fluid pressure differentials across the filter septum is arranged with one face of the septum exposed to the contaminated liquid and the opposite face exposed to the suction pressure of a pump with the discharge of the pump capable of being redirected to backflush through the filter septum, such backflushing being carried out sequentially through small area segments of the septum. The return of a flight conveyor may be moved selectively into and out of scraping or wiping relation with the filter and filter wiping and backflushing may be automatically controlled.

13 Claims, 6 Drawing Figures

LIQUID CLARIFIER AND METHOD

FIELD OF INVENTION

This invention relates to liquid purification or clarification, and more particularly to separating or removing solid particles dispersed or suspended in liquids such as the cuttings or swarf from automatic cutting or grinding machines, and is particularly concerned with the clarification of cooling liquids or lubricants used in such machines.

BACKGROUND OF THE INVENTION

It is a common practice to employ filtration systems in connection with metal machining operations using liquid coolants and lubricants. As the liquid carries away metal chips, turnings, and other material from the work areas, it must be clarified before being again pumped through the system or discharged to the sewer. A conventional form of apparatus used in such filtering processes comprises a settling tank and a clean-liquid tank with a filter screen separating the tanks and through which the liquid to be clarified is caused to pass. The filtration efficiency increases as small contaminants build up on the screen to form a bed on the surface thereof, since these contaminants also serve to block the flow of other solid materials in the liquid. However, as the efficiency increases with the progressive clogging of the filter, the rate of flow of liquid from the settling tank to the clean-liquid tank decreases and, if permitted to progressively decrease, would eventually approach zero.

It is common practice to provide a flight conveyor having transverse flights which scrape the bottom of the settling tank and remove the sludge through a discharge chute. Heretofore apparatus has been constructed wherein a return run of the flight conveyor is used to scrape the bed or cake forming on the surface of the filter to thereby prevent an undue build-up. Such a clarifying apparatus has been in use for several years at the Oldsmobile Division of General Motors Corporation in Lansing, Mich. Also, in U.S. Pat. No. 3,748,835 there is disclosed a filter having a downwardly opening face which is scraped by the return run of a flight conveyor.

One of the difficulties with these prior art arrangements is that it is necessary to index the flight conveyor if there is a large chip or swarf load in the settling tank and this in turn will cause the return run of the flight conveyor to scrape the filter cake on the septum even though it may not be desirable to scrape the cake. Another disadvantage of such prior art arrangements is that the septum or filter screen is not readily accessible for cleaning or replacement. In addition, if there is an unusually large chip or swarf load on the filter, it may cause the flight conveyor to jam, requiring an expensive and time consuming shut-down of the clarifier. Finally, the aforementioned prior art operated on a pressure differential across the filter septum of from 0 to 3 psi and this required a relatively large area filter to obtain the flow volumes required for many applications and effectively limited the septum slots or openings to not less than about 0.002 inches.

SUMMARY OF THE INVENTION

This application is a companion to my co-pending application Ser. No. 06/207,214 filed Nov. 17, 1980, to which reference may be made for additional background information. In the present application I have disclosed a clarifier which substantially increases the fluid pressure differentials across the filter septum to allow the use of smaller septum openings and/or great liquid flows per square foot of septum area. This enables the use of a finer filter screen and/or a smaller filter area to accomplish clarification heretofore requiring a larger filtering apparatus. To accomplish this, the filter septum is arranged with one face exposed to the contaminated liquid to be clarified, and the opposite face exposed to the suction pressure of a pump. The discharge of the pump may be redirected to backflush through the filter septum. The backflushing may be carried out sequentially through small area segments of the septum utilizing the discharge of the aforesaid pump. This arrangement allows the device to clarify higher capacities per square foot of screen area than the aforementioned prior art clarifiers.

In my improved clarifier the return of the flight conveyor is arranged adjacent the filter and is selectively movable into and out of scraping or wiping relation therewith.

During operation, filter wiping and backflushing may be automatically controlled in accordance with a predetermined time interval or in response to clogging of the filter. If the clogging impedes the fluid flow sufficiently so that the pressure differential across the septum exceeds a predetermined amount, the filter wiper is activated, and if this does not sufficiently clean the filter to restore the fluid pressure differential to an acceptable value, then the backflusher is activated.

During either filter wiping or backflushing, the clarifier may continue to accept contaminated liquid for clarification, and continue to perform the clarification function.

The filter septum may be readily removed for maintenance or cleaning without necessitating disassembly of the flight conveyor or any substantial dismantling of other portions of the clarifier.

BRIEF DESCRIPTION OF PREFERRED EMBODIMENT

Figure 1:
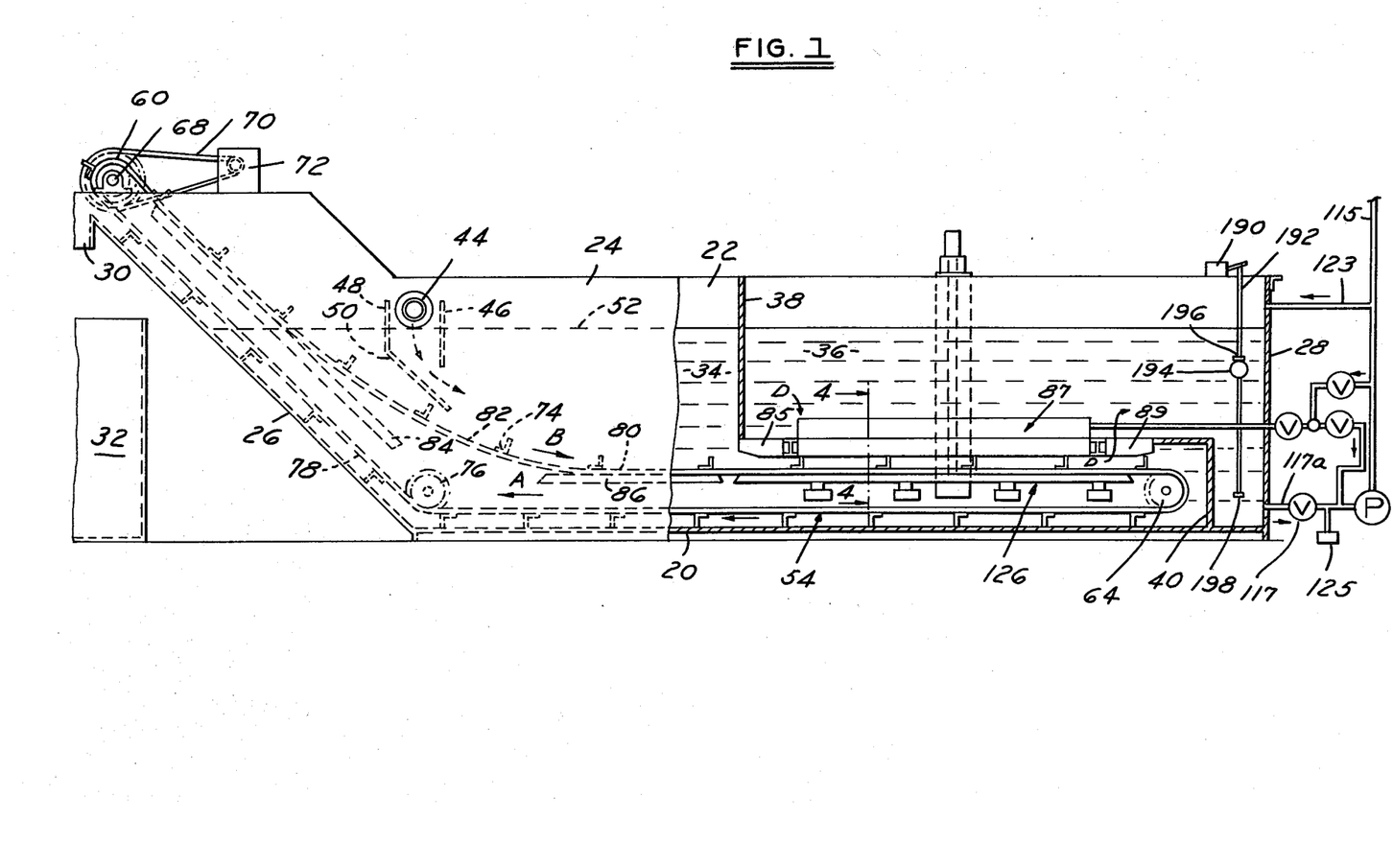
FIG. 1 is a side elevation of a clarifier embodying my invention with a portion of a side wall removed to show internal mechanism.

As shown in the various figures of the drawings, the clarifier comprises a container having a bottom wall 20, side walls 22 and 24 and end walls 26 and 28. End wall 26 slopes upwardly as best shown in FIG. 1, terminating in a sludge discharge chute 30 from which the material filtered from the coolant and lubricating fluid is discharged to a suitable receptacle 32.

The container 24 is divided into a settling tank 34 and a clean-liquid tank 36 by a partition comprising a pair of vertical portions 38 and 40 and a horizontal portion 42, all of which extend transversely between the side walls 22 and 24 with the vertical wall 38 extending downwardly from the upper edges of the side walls 22 and 24 to the horizontal portion 42 and the vertical portion 40 extending downwardly to the bottom wall 20 of the container.

Contaminated influent enters the settling tank 34 through an inlet pipe 44 connected to a source thereof, such as machine tools or the like. Its incoming velocity is broken by a baffle arrangement comprising a pair of vertical walls 46 and 48, with the latter having a downwardly angling portion 50. The baffle arrangement will deflect the influent as shown by the arrows in FIG. 1. The location of the entry pipe 44 may vary, depending upon the size of the clarifier and its intended use. The influent is intended to fill the settling tank 34 to approximately the level 52.

Large chips and sludge contained in the influent settle to the bottom 20 and are removed by a flight conveyor 54 which includes a pair of endless chains 56 and 58 more fully described in my aforesaid co-pending application which are entrained over drive sprockets one of which is shown at 60 with the opposite end of the chains entrained over idler sprockets, one of which is shown at 64. The drive sprockets 60 are mounted on a drive shaft 68 supported in suitable bushings at the upper edges of the side walls 22 and 24. The shaft 68 is driven through a power train 70 by a suitable electric motor 72. The direction of rotation is such that the forwarding run 78 of the conveyor moves in the direction of arrow A, while the return run moves in the direction of arrow B. Extending transversely between the chains are L-shaped blades or flights 74 which, on the forwarding run 78 are disposed to scrape the bottom walls 20 and 26 of the settling tank. The flights are held against such walls by the idler sprockets 76. On the return run 80 of the drag conveyor, the chains hang in a catenary curve 82 between guides 84 and 86 which underlie the return run. The slack in the chains at the curve 82 permits a certain looseness beneath the filter which is advantageously employed as hereinafter explained. Further disclosure of the chains and flights 74 may be found in the said co-pending application.

Figure 2:
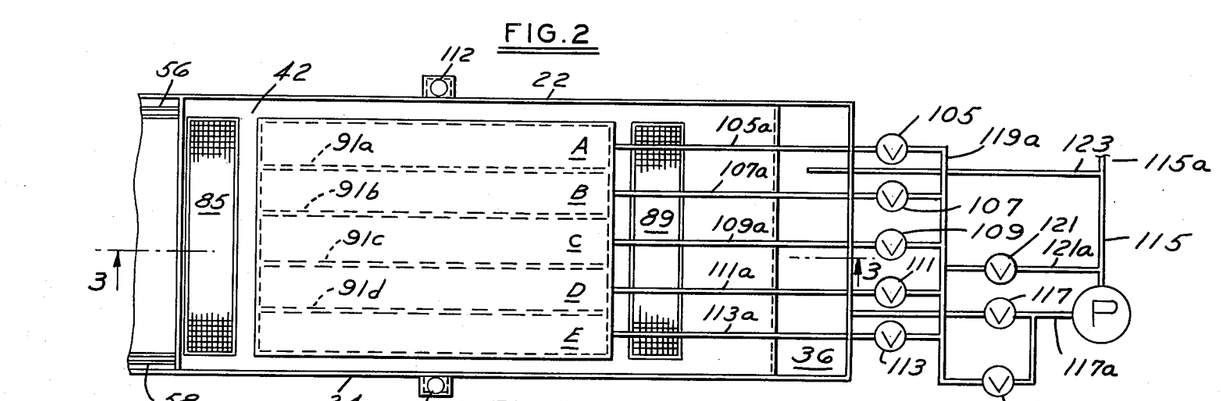
FIG. 2 is a plan view of the clean-liquid tank portion of the clarifier of FIG. 1.
Figure 4:
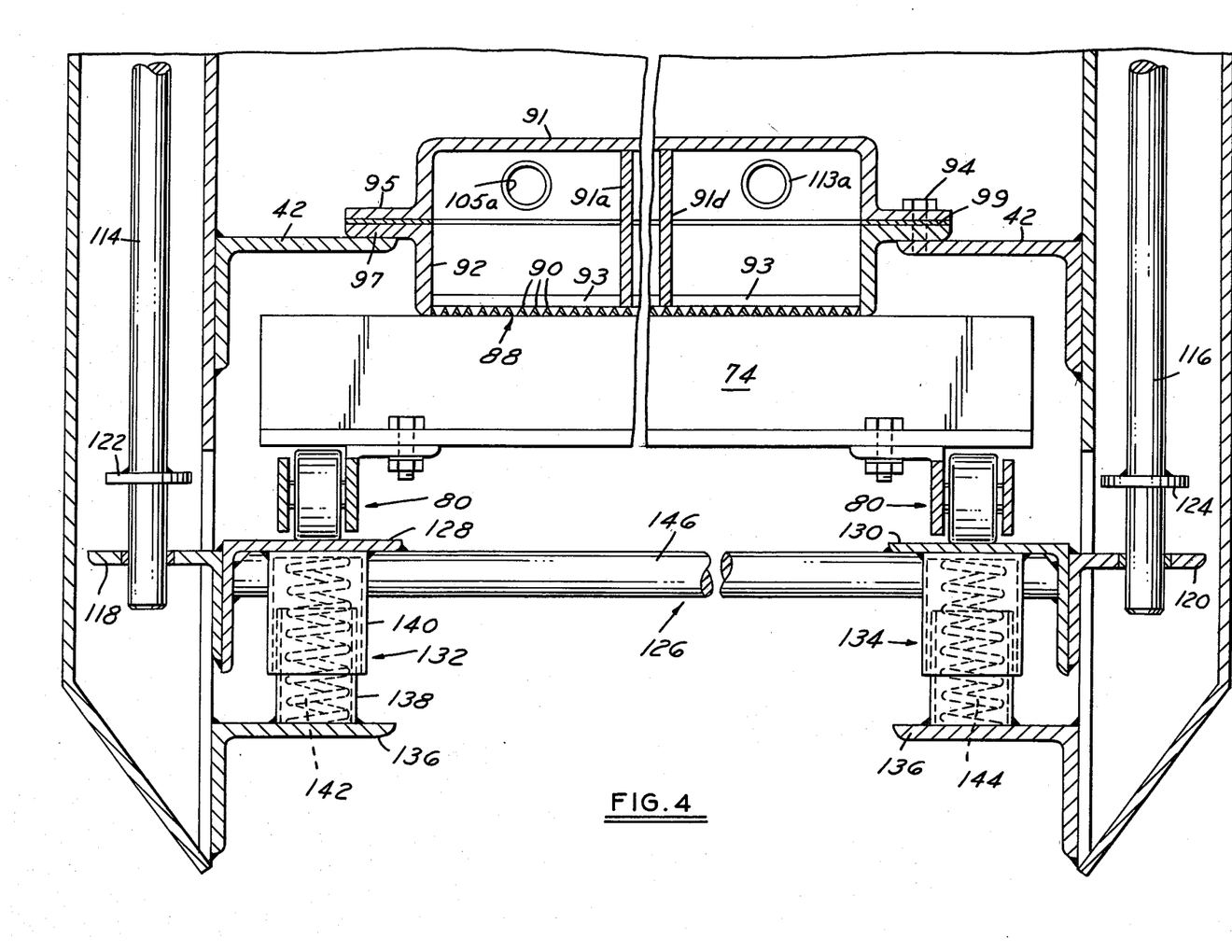
FIG. 4 is a cross-sectional view taken on a line 4—4 of FIG. 3.

The horizontal partition wall 42 between the clean-liquid tank and the settling tank defines three rectangular openings within which are received filters 85, 87 and 89 as shown in FIGS. 1 and 2. Each of these comprises a wedge wire or the like septum 88 (see FIG. 4) comprising a closely spaced series of stainless steel wedge-shaped bars 90 supported in a rectangular frame 92. The bars are backed up by transverse stiffeners 93. The slots between the bars at the narrowest slot opening may be 0.001 inches to 0.060 inches and are designed to suit the particular application for which the clarifier is to be used. Filter 87 is shown in FIG. 4. It differs from filters 85 and 89 in that it is a vacuum box filter and is connected to the suction side of centrifugal pump P through a segmented vacuum box. Filters 85 and 89 are open at the top to clean liquid tank 36 permitting free liquid flow between tanks 34 and 36 dependent on the difference of liquid levels in the tanks.

While a cross-sectional view through filters 85 and 89 is not provided, such filters are similar to the filter shown in may aforesaid companion application, and can be adequately described by reference to FIG. 4 of the present disclosure. Filters 85 and 89 each have a rectangular frame similar to frame 92 and are supported within their respective rectangular openings in the partition 42 on peripheral flanges similar to flanges 97 and suitable fasteners similar to bolts 94 secure them in place. Filter 87 differs from the filters 85 and 89 in that the upper face of filter 87 is closed by a hat-shaped cover 91 while filters 85 and 89 do not have such a cover. The cover 91 has a peripheral flange 95 which mates with the complementary flange 97 of the frame 92 of filter 87. A gasket 99 is disposed between the flanges 95 and 97 to seal against fluid flow therebetween and fasteners 94 extend through the flanges and through tank wall 42 to secure the structure together. The cover 91 cooperates with the frame 92 to form a vacuum or suction box.

Thus filter 87 comprises a closed vacuum or suction box whose bottom is a wedge wire septum. The interior of the vacuum box is subdivided by partitions 91a, 91b, 91c and 91d, as shown in FIGS. 2 and 4, to provide independent segments or compartments A, B, C, D and E within the box. Means are provided for connecting all the compartments with the intake side of pump P to draw liquid from the compartments or sequentially connecting individual compartments with the discharge side of the pump to backflush the filter septum through the small area thereof beneath each such compartment. To this end each such compartment is connected by pipes 105a, 107a, 109a, 111a, 113a and 119a through solenoid control valves 105, 107, 109, 111, 113 and 119, in a piping system shown in FIGS. 1 and 2. Pipe 119a communicates with the suction side of pump P through pipe 117a, being connected thereto between the pump and a solenoid valve 117. Pipe 117a communicates with the clean-liquid tank 36. Discharge from pump P is delivered through pipe 115. A branch 121a off pipe 115, controlled by a solenoid valve 121, is adapted to connect the discharge of pump P with the pipe 119a. Another branch 123 delivers liquid to the clean-liquid tank 36. Pipe 115 also delivers liquid from pump P via branch 115a either back to the machine tools or the like in a recirculating system, or delivers it for other disposal. A vacuum switch 125, FIG. 1, connected to pipe 117a at the suction side of the pump, is responsive to variations in the suction pressure. Switch 125 has two pairs of contacts 125' and 125" as shown in FIG. 5b. Contacts 125' close when the vacuum at the inlet of pump P exceeds a preset value such as −4 psi and 125" open when the vacuum is less than this.

The piping may be sized or flow control valves may be used so that in normal operation, about 5% of the discharge from pump P passes through branch line 123 back to the clean tank 36 to eventually raise the liquid level in the clean tank above liquid level 52 in the settling tank 34. Thereupon the liquid will flow counter the arrows D from the clean-liquid tank 36 back into the settling tank 34, thereby reversely flushing the filters 85 and 89, and tending to keep the wedge wire screens thereof in a nonplugged condition.

Pump P is sized to suit the requirements of the recirculating system plus 25% for backflushing and approximately 5% for recirculation through pipe 123. During normal filtering operation, the flow through the vacuum box filter 87, will be the system requirement plus the 5% for pipe 123. The excess capacity is simply shown as an additional head pressure on centrifugal pump P. The piping system shown in FIGS. 1 and 2 enables the pump to backflush through filter 87. During the backflushing or backwashing cycle, the pump P delivers the entire flow (130%) from the clean storage tank 36 back into the vacuum box to reversely flush the filter as hereinafter described.

During normal filter operation the solenoid valves are set as follows: Valves 105, 107, 109, 111, 113 and 119 are open while valves 117 and 121 are closed. Liquid is drawn from the settling tank 34 up through the septum of filter 87 and passes through the lines 105a, 107a, 109a, 111a, 113a, 119a and 117a to the inlet side of pump P, and from the pump moves out through line 115 with a small portion (5%) of the flow being returned to the clean tank 36.

As liquid flows through the wedge wire septums of filters 85, 87 and 89, particles larger than the slot opening of the filters are impeded, which in turn impede finer particles, thereby forming a filter cake on the underside of the septums. Large flows per square foot are utilized in my improved filter to promote rapid build-up of the cake. As the filter cake increases in depth, resistance to liquid flow through it increases and the vacuum at the inlet side of pump P as sensed by the vacuum switch 125 increases.

The vacuum switch 125 provides a means for sensing the decreasing porosity (i.e., clogging) of the filters, or the increasing porosity (i.e., unclogging) of the filters. As the filter cake builds up on the underside of the septums, the resistance to flow of liquid from tank 34 to the pump P is impeded and the vacuum in the line 117a increases and this will be sensed by the switch 125. When the vacuum exceeds a predetermined amount, the filter wiper 126 is activated, raising the return run 80 of the flight conveyor into scraping relation with the cake and the cake is scraped by the conveyor 54, thereby increasing the porosity of the filter, allowing more liquid to flow therethrough. If the flow through the filter is sufficient, the vacuum as sensed by the switch 125 will be restored to within a preset range. However, if scraping of the filter cake by the flight conveyor does not reduce the vacuum to an acceptable level within a predetermined time period, then backwashing of filter 87 is activated. An acceptable vacuum level may, for example, be from 0 to $-4$ psi. If the vacuum is greater than $-4$ psi the scraper conveyor return run is raised in septum scraping relation as aforesaid. If scraping does not serve to reduce the vacuum to less than $-4$ psi, then the the backflushing operation is commenced.

The return run 80 of the flight conveyor is raised into septum scraping relation by mechanism of the character more particularly described in the aforesaid co-pending application. Suffice it that a pair of air cylinders or the like 110 and 112, FIG. 2, mounted at the upper edge of the side walls 22 and 24, have downwardly extending push rods 114 and 116 which extend at their lower ends through brackets 118 and 120. The push rods are provided with flanges 122 and 124 adapted to bear against the brackets 118 and 120 when the cylinders are pressurized at their upper ends, thereby depressing the brackets. When the cylinders are pressurized at their lower ends, the push rods are raised as shown in FIG. 4. A solenoid valve 106 (see FIG. 5b) controls pressurization of the cylinders 110 and 112 as more fully shown in said co-pending application.

Brackets 118 and 120 are secured to the filter wiper springloaded flight conveyor guide assembly 126 (FIG. 4). The guide assembly includes a pair of elongated guide rails 128 and 130 upon which ride the return run 80 of the flight conveyor. Each rail is supported by spring supports 132 and 134, which normally urge the rails upwardly bringing the flights 74 into cake scraping relation with the filter cake formed on the underside of the septums. Each of the springloaded assemblies includes a mounting bracket 136 secured to the side of the tank. A pair of interfitting sleeves 138 and 140 are secured respectively to the bracket 136 and the guide rail 128, and a coil spring 142 is disposed within the sleeves to bear against the bracket 136 and the guide rails 128 and 130. The telescoped sleeves serve to stabilize the rails against lateral displacement while guiding them for vertical movement. Transverse members 146 are secured at opposite ends to the rails 120 and 130. The brackets 118 and 120 are secured to the rails 128 and 130.

Figure 3:
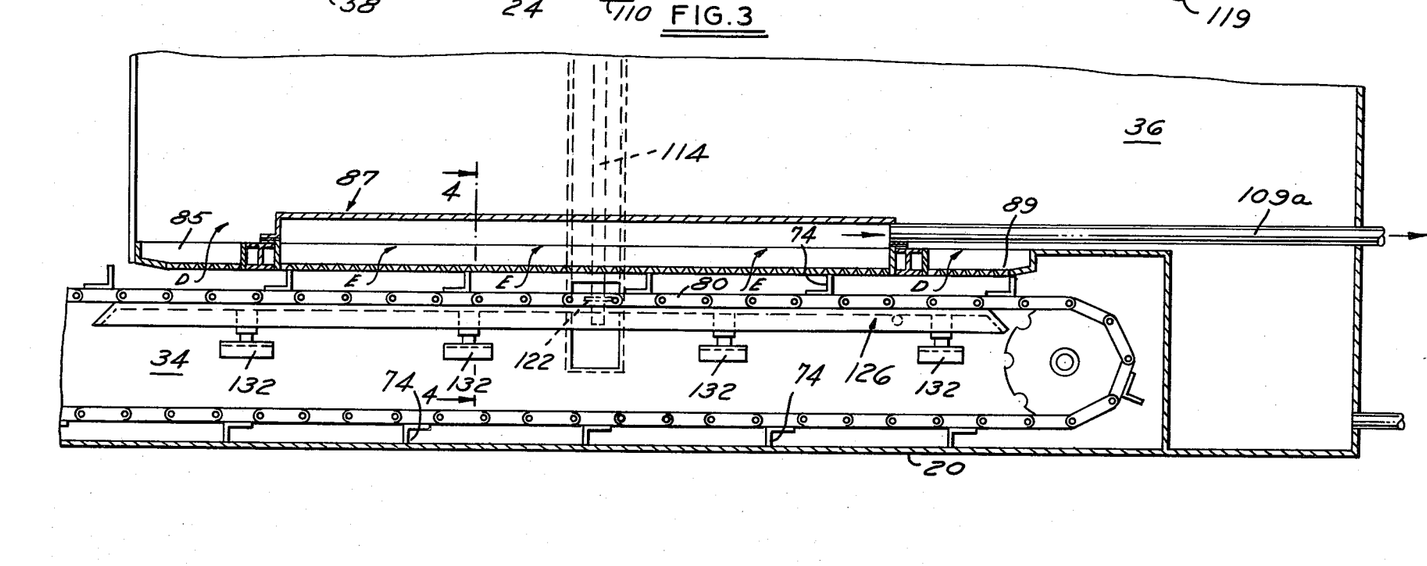
FIG. 3 is an enlarged fragmentary section through the clean-liquid tank portion of the clarifier showing the return flight cooperating with the septum.

Upon pressurizing the upper ends of air cylinders 110 and 112, the push rods 114 and 116 are moved downwardly to bring the flanges 122 and 124 against the brackets 118 and 120, thus pressing the conveyor guide rails 128 and 130 downwardly against the tension of the springs 142 and 144 thus lowering the rails and allowing the conveyor flights 74 to drop by gravity downwardly away from the septums as a result of the catenary curve in the return run of the conveyor. Conversely, upon reverse pressurization of the air cylinders, the springs 142 and 144 will cause the rails to rise, moving flights 74 into contact with the filter cake on settling tank side of the filters so that the flights 74 will scrape the cake from the septums of the filters 85, 87 and 89. The spring force of the coil springs 142 and 144 maintains a constant contact between the flight conveyor and the filter screens when in the position shown in FIG. 4. As the conveyor flights scrape the filter septums on the return run, the filter cake is moved along the screens. The conglomerated portion of the cake which reaches the righthand end of the screens as viewed in FIG. 3 will fall by gravity to the bottom of tank 34 and be removed therefrom by the flight conveyor on its forward run.

The movement of the filter cake under the influence of the transverse flights of the drag conveyor promotes porosity of the filter by reducing resistance to flow and thus reducing the vacuum level at switch 125 and in turn increasing the flow through the filter septum of filter 87. At a predetermined vacuum setting, the air cylinders are reversely pressurized, thereby urging the push rods downwardly, bringing the flanges against the brackets 118 and 120 to move the rails 128 and 130 downwardly, in turn moving the return run of the drag conveyor away from the septum of the filter. The flight conveyor will then operate out of contact with the filter cake, simply serving to drag sludge, chips and other matter in the bottom of the settling tank to the chute 30 for discharge from the clarifier.

As mentioned above, if the foregoing filter-cleaning sequence does not restore the vacuum as sensed by switch 125 to an acceptable level, the backwash is energized to backwash the filter septum of filter 87. In carrying out the backwashing cycle, solenoid valves 105, 107, 109, 111, 113 and 119 are closed while valves 117 and 121 are open. A sequence timer connected to valves 105, 107, 109, 111 and 113 serves to open each of the valves for a predetermined time interval, and then closes the valve and opens the next. This is continued until all five valves have been sequenced. At the end of the sequence, valve 119 is opened and valves 117 and 121 are closed.

During the backwash cycle, liquid is drawn by pump P from the clean tank 36 through valve 117 and pumped to the work as during the normal filter cycle. However, a portion of the flow, approximately 25%, is diverted through valve 121 and then through one of the valves 105, 107, 109, 111, or 113 into one of the segments or compartments A, B, C, D or E of the vacuum box to effect a reverse flow through the septum of that compartment, thereby clearing the septum. It will be noted that during the normal filter cycle approximately 20% of the flow is filtered by the septum associated with each compartment of the vacuum box, while on the backwash cycle 25% of the flow will be in a reverse direction through that septum segment. I have found that for a backwash of this nature to be satisfactory, the backwash flow must be at least equal or greater than the filter cycle flow. Of course, for a given pump capacity, the more backwash segments provided in the vacuum box, the greater the backwash flow per segment.

During the backwash cycle, the liquid to satisfy the work requirement as well as the backwash is drawn by the pump P from the clean storage tank 36. As soon as the level in tank 36 drops below the level in tank 34, liquid will flow through the open screens of filters 85 and 89. This flow will not be as great as the normal flow of the system, but will help extend the length of time during which the screen of filter 87 can be backwashed and/or will serve to reduce the size requirement for the clean reservoir 36.

Means are provided for limiting the backflushing or backwashing cycle so that the liquid level in clean tank 36 is not drawn down below an acceptable minimum. Such means comprises a float switch 190 having a rod 192 extending down into the clean tank and upon which is mounted a float 194 for slidable movement on the rod between stops 196 and 198. When the liquid level in tank 36 drops to the point where float 194 contacts the stop 198, the switch 190 is then opened causing solenoid valves 117 and 121 to be closed and solenoid valve 119 and valves 105, 107, 109, 111 and 113 to be opened, thereby returning the clarifier to the normal filtering cycle. When the liquid level in tank 36 rises so that float 194 contacts the stop 196, the switch 190 will be again tripped, setting up the system for backflushing the filter septum of filter 87.

Figure 5A:
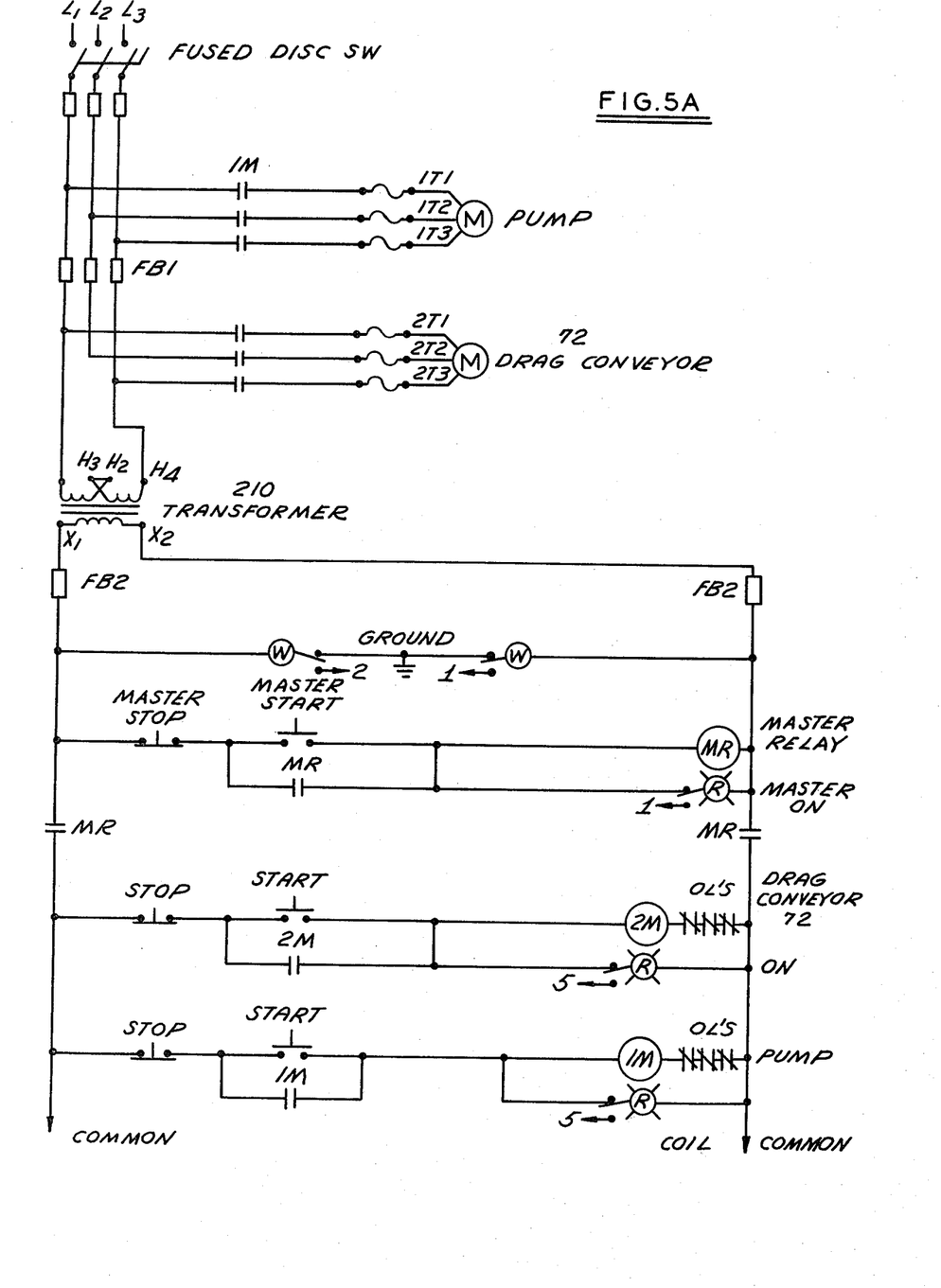
FIGS. 5A and 5B show a schematic control circuit for my clarifier.
Figure 5B:
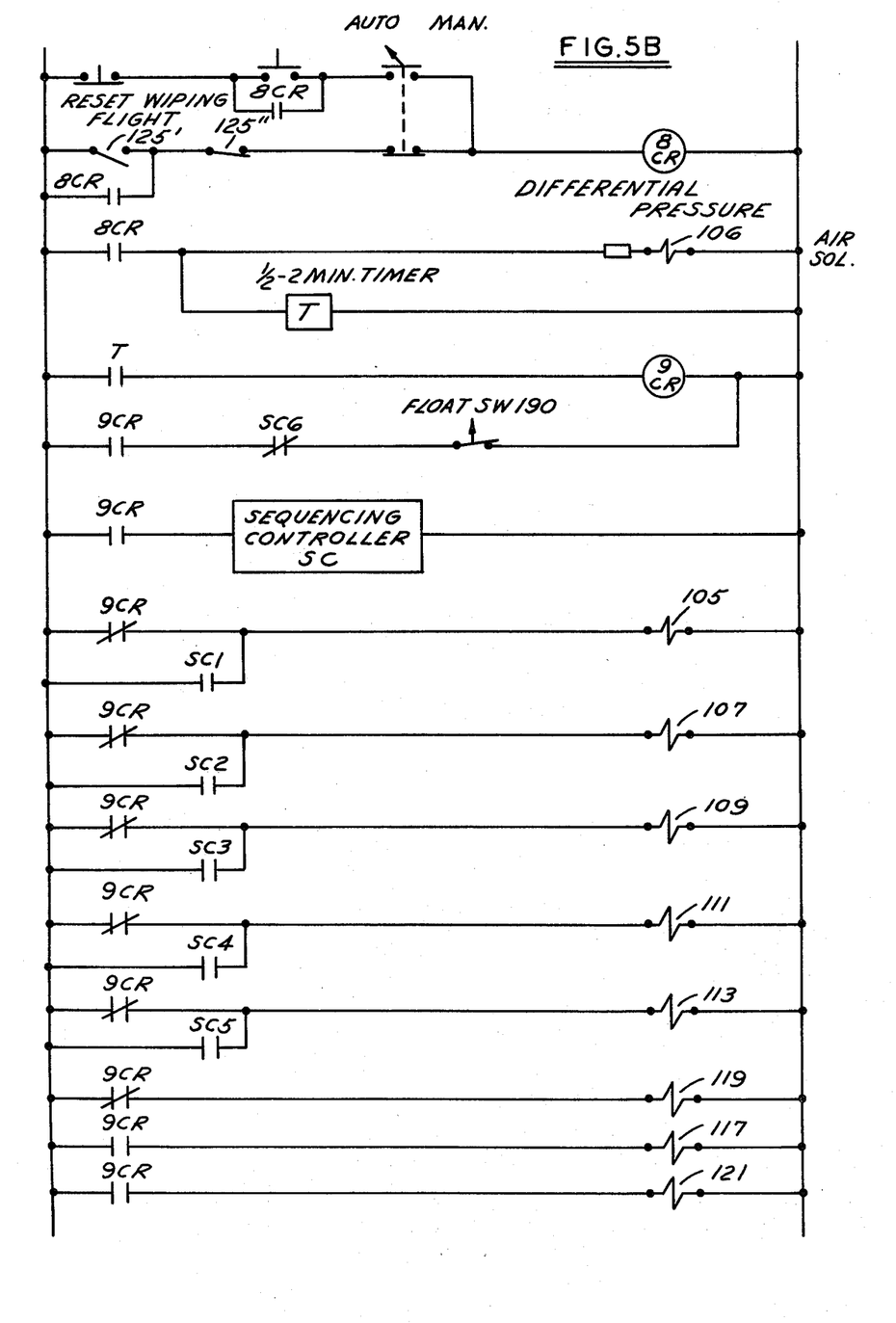

The foregoing control of the clarifier is accomplished by a control system schematically shown in FIGS. 5a and 5b. This control system is merely intended to be representative, and other or different control systems could be provided by those skilled in the art to carry out the function as herein explained. In FIGS. 5a and 5b a three-phase 440 volt power source at L1, L2 and L3 supplies the centrifugal pump P and flight conveyor motor 72 and then through a transformer 210, a 110 volt control circuit. The circuit diagram of FIGS. 5a and 5b utilizes conventional symbols and with the following brief description it is thought that those skilled in the art will readily understand the functional arrangement. The solenoid control valves hereinafter referred to are normally closed, i.e., when energized they open, and de-energeized they close.

With the master control circuit switch on, and the drag conveyor motor start switch on, motor control 2M is energized starting motor 72. Similarly, start switch for pump P is closed to start the pump motor. With these devices operating and dirty liquid being delivered to the settling tank as aforesaid, and with the circuit of FIG. 5b set on "AUTO" when the vacuum switch 125 determines that the vacuum at the pump inlet exceeds a preset value, such as a −4 psi, the switch contacts 125' are closed energizing relay 8CR and in turn energizing solenoid valve 106, thereby causing air to be delivered to the lower ends of cylinders 110 and 112. This will cause the flight conveyor return run to scrape the filter septums, and if such scraping suffices to open the filter sufficiently that the flow is increased in an amount reducing the vacuum level at the pump inlet to below −4 psi (or some lesser value), then the contacts 125" are opened which will in turn de-energize solenoid valve 106 causing the upper ends of the air cylinders 110 and 112 to be pressurized and the lower ends vented to the atmosphere. The push rods 114 and 116 are then moved down, thereby lowering the flight conveyor from the filter septum to stop scraping thereof.

During operation of the wiping mode of the scraper conveyor as above described, a timer T (see FIG. 5b), which is adjustable for from 30 seconds to two minutes, is energized, and if operation of the flight conveyor in the wiping mode for, say, one minute, is insufficient to open the filter porosity enough to reduce the vacuum as sensed by switch 125 to less than −4 psi (or such other acceptable value as the vacuum switch is set for), then normally open contacts T are closed and relay 9CR is energized when timer T times out. With relay 9CR energized, the normally closed contacts of such relay are opened, thereby de-energizing and closing valves 105, 107, 109, 111, 113 and 119, while normally open relay contacts are closed, thereby energizing and opening solenoid valves 117 and 121. The sequencing controller SC is of conventional construction, having contacts SC1, SC2, SC3, SC4 and SC5 which are connected to the solenoid valves 105, 107, 109, 111 and 113 and serve to sequentially energize (and thereby open) each of them, resulting in the valves being sequentially opened for a determined time interval, for example 10 seconds to 50 seconds (as desired) and then closed. At the end of the timer sequence, contacts SC6 are opened momentarily to de-energize relay 9CR. This serves to energize and open all of the solenoid valves 105, 107, 109, 111, 113 and 119, and de-energizes and causes to close valves 117 and 121, thus terminating the backflushing cycle. It will be noted from FIG. 5b that if float switch 190 is opened as a result of the liquid level in tank 36 dropping below a permissible amount, this will also serve to de-energize 9CR to stop the backflushing cycle. Backflushing then will not resume until the float switch 190 is again closed by the liquid level rising sufficiently in the clean-liquid tank.

It will be noted from the foregoing description that by drawing the liquid from the vacuum box to the suction side of the pump, the full available suction pressure of the pump (0–14 psi) may be used to overcome resistance to flow offered by the filter cake rather than between 0–3 psi of the prior art. This enables the use of a smaller slot opening in the wedge wire filter and/or greater flow per unit screen area.

I claim:

1. A liquid clarifier comprising, in combination:
 a settling tank;
 a clean-liquid tank;
 a filter having one face exposed to liquid in the settling tank;
 a vacuum box closing the opposite face of said filter;
 a pump having a suction side and a discharge side;
 means for connecting the said suction side to the vacuum box and the discharge side to the clean-liquid tank or connecting the suction side to the clean-liquid tank and the discharge side to the vacuum box to backflush therethrough;
 a flight conveyor in the settling tank having a forwarding run arranged to scrape the bottom of the settling tank and move sludge to a discharge chute and a return run arranged adjacent the filter; and positioning means for selectively positioning the conveyor return run either close to the filter to scrape a filter cake formed thereon or position the return run in spaced non-scraping relation.

2. The invention defined by claim 1 wherein means are provided responsive to clogging of the filter for causing the first mentioned means to backflush through the filter.

3. The invention defined by claim 2 wherein said means responsive to clogging of the filter is also operable to cause the positioning means to move the return run into cake scraping relation with the filter.

4. The invention defined by claim 1 wherein the filter is disposed substantially horizontally and the liquid flow is upwardly through the filter and the return run of the conveyor is disposed below the filter and moved upwardly theretoward to scrape the filter cake or downwardly away from it to non-scraping position.

5. The invention defined by claim 1 wherein said positioning means includes resiliently supported conveyor guides cooperating with the conveyor to urge the conveyor return run into filter-cake-scraping relation with the filter.

6. The invention defined by claim 5 wherein said positioning means also includes selectively operable apparatus for shifting the conveyor guides away from the filter.

7. The invention defined by claim 1 wherein said vacuum box comprises a series of compartments and said means for connecting the pump to the box is connected to each of said compartments and includes sequencing mechanism for backflushing successively through one compartment after another.

8. The invention defined by claim 7 wherein means is provided responsive to clogging of the vacuum box filter to initiate backflushing through the vacuum box filter.

9. The invention defined by claim 8 wherein means is provided responsive to a predetermined lowering of the liquid level in the clean-liquid tank to discontinue the backflushing through the vacuum box filter.

10. A liquid clarifier comprising, in combination:

a settling tank;

a clean-liquid tank;

a filter between the tanks through which liquid flows from the settling to the clean-liquid tank;

a vacuum box filter exposed to liquid in the settling tank;

a pump having a suction side communicating with the vacuum box and a discharge side communicating with the clean-liquid tank;

a flight conveyor in the settling tank having a forwarding run arranged to scrape the bottom of the settling tank and move sludge to a discharge chute and a retuan run arranged adjacent the filters;

conveyor guide means for selectively positioning the conveyor return run close to the filters to scrape a filter cake formed on each filter or position the return run in spaced non-scraping relation with the filter cakes; and control means responsive to clogging of at least one of the filters die causing the guide means to position the conveyor return run in filter-cake-scraping relation.

11. The invention defined by claim 10, wherein said control means is responsive to clogging of the vacuum box filter to connect the suction side of the pump to the clean-liquid tank and the discharge side of the pump to the vacuum box filter to backflush therethrough.

12. The invention defined by claim 10 wherein said control means is first operative in response to clogging of one of the filters to cause the guide means to position the conveyor return run in filter-cake-scraping relation and is thereafter operative to connect the suction side of the pump to the clean-liquid tank and the discharge side of the pump to the vacuum box filter to backflush therethrough.

13. The invention defined by claim 11 wherein said vacuum box filter comprises a series of compartments and said control means is operative to connect the discharge side of the pump to each of said compartments and includes reversing mechanism for backflushing successively through one compartment after another.

* * * * *